United States Patent [19]

Hanig

[11] Patent Number: 4,905,770

[45] Date of Patent: Mar. 6, 1990

[54] SHIELD ASSEMBLY FOR A CULTIVATOR

[75] Inventor: John A. Hanig, Sheffield, Iowa

[73] Assignee: Sukup Manufacturing Company, Sheffield, Iowa

[21] Appl. No.: 125,242

[22] Filed: Nov. 25, 1987

[51] Int. Cl.[4] .................................................. A01B 39/26
[52] U.S. Cl. ..................................... 172/509; 172/624.5
[58] Field of Search .............. 172/509, 512, 508, 513, 172/624.5, 511, 705, 498, 499, 497

[56] References Cited

U.S. PATENT DOCUMENTS

| | | | |
|---|---|---|---|
| 846,876 | 3/1907 | Toepfer | 172/509 |
| 1,661,985 | 3/1928 | Wilson | 172/513 |
| 2,660,941 | 12/1953 | Carelock | 172/509 |
| 4,121,669 | 10/1978 | Sosalla | 172/509 X |
| 4,126,190 | 11/1978 | Wylie | 172/624.5 |
| 4,282,936 | 8/1981 | Zuhone | 172/512 |
| 4,423,788 | 1/1984 | Robinson, Jr. | 172/624.5 X |
| 4,552,225 | 11/1985 | Behn | 172/513 |
| 4,715,449 | 12/1987 | Winter | 172/513 |
| 4,766,962 | 8/1988 | Frase | 172/624.5 |

OTHER PUBLICATIONS

Buffalo, "All Flex Cultivator Brochure", Fleischer Mfg. Inc., Jan. 13, 1989.
Glenco, "Row Crop Cultivator", Brochure, Sept., 1972.
Sukup, "High Residue Cultivator", Brochure, Feb., 1989.
Sukup, "Ridgeway", Brochure, Jan., 1989.
Tebben Manufacturing, Conservtill Cultivator Brochure.
Buffalo Farm Equipment, All-Flex Cultivator Brochure.
Orthman Manufacturing, Inc., Ridge Cultivator Brochure.
Noble Division of Lear Siegler, Inc., All-Till Cultivator Brochure.
Wetherell Mfg. Co., No-Till Cultivator Brochure.
Dakon, Conser-Till Cultivator Brochure.
John Deere, Photographs of Cultivator.

Primary Examiner—Andrew V. Kundrat
Assistant Examiner—Jeffrey L. Thompson
Attorney, Agent, or Firm—Neuman, Williams, Anderson & Olson

[57] ABSTRACT

Shield assemblies that are designed to be used with cultivators are disclosed. Shields are mounted to the assembly such that they are laterally rigid but vertically retractable. The shield assembly includes a parelleogram linkage system with a torque bar, to add stability, and slotted top links as well as a spring across the top and bottom link to facilitate pivotal movement of the shields. Each shield is mounted to at least two support portions; a first substantially vertical portion and a second portion which crosses the shield's main portion diagonally, thereby virtually eliminating rotation about either axis of the plane of the shield.

27 Claims, 2 Drawing Sheets

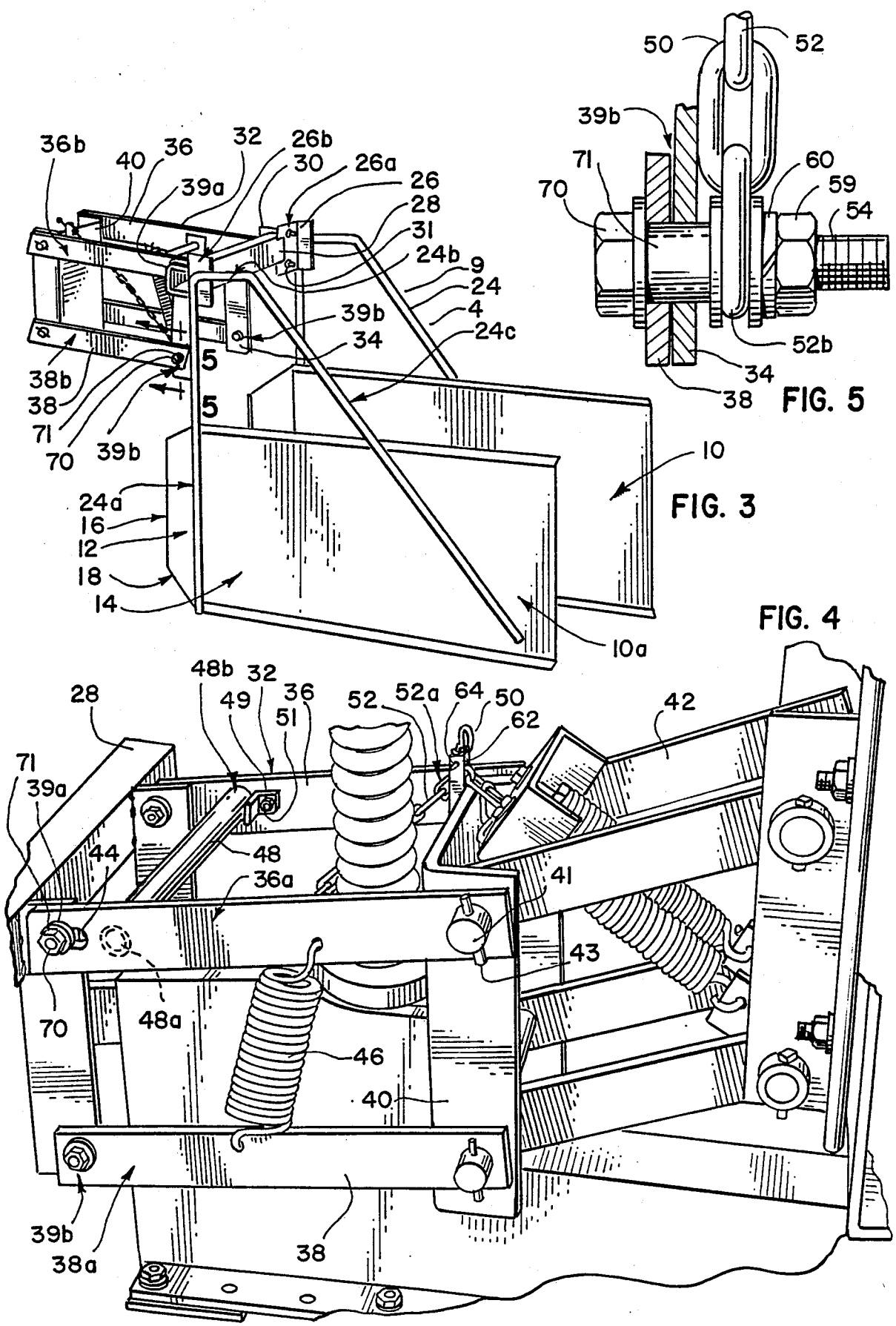

SHIELD ASSEMBLY FOR A CULTIVATOR

BACKGROUND OF THE INVENTION

The invention relates to shields for use with row-crop cultivators.

In the cultivation of row crops, farmers often encounter trash from preceding crops, grasses, large weeds, and difficult soil conditions including rocks and other heavy debris embedded in the ground. Such conditions are particularly common where ridge-till, no-till or minimum till planting procedures are employed. Rocks or other debris encountered during such cultivation can damage the equipment. In addition, when ridges are being built, slabs of soil, rocks or debris flowing from the ridger can damage the crop plants being cultivated.

Numerous shields in the form of attachments to cultivators have been developed for the purpose of protecting row crops during cultivation and/or ridge building. Such shields are designed to be located between the cultivating tools and the crop plants to prevent flying debris from damaging the plants.

For cultivating small plants, rolling, tunnel or tent shields affixed to a tool bar can be used. The latter shields are in the form of arched pieces of metal that completely cover the plants as the cultivation tools move along between the crop rows. Tunnel shields can be adjusted for height and for placement in relation to cutting disc hillers and sweeps.

For taller plants, substantially planar vertical shields are used that typically are formed of sheet metal. With some shields, a portion is bent away from the crop rows at the front of the shield to gather the plant leaves without damage thereto and to further deflect debris. Such shields can be attached to one or more brackets which in turn are attached to a horizontal arm mounted to the main tool bar of the cultivator implement. The shield can be moved vertically by adjusting the brackets. Also, the horizontal arm can be bolted solidly in place or allowed to pivot and float upwardly, for instance with a spring arrangement, to allow movement over rocks and trash. Some shields can be pivoted upwardly, completely out of the way of the crop plants.

The planar shields are positioned substantially parallel to one another on opposing sides of the cultivator equipment. In some instances, the mounting apparatus for the shields is located directly above the respective crop row, joining a pair of shields disposed on opposite sides of the same row. An example is shown in U.S. Pat. No. 4,552,225 for Cultivation Shield Attachment issued on Nov. 12, 1985. As is apparent, such an arrangement can interfere with tall crop plants. Other shields, known as open top shields, are paired such that they are joined over the cultivating equipment, i.e., each joined pair connects a shield on each side of a cultivator unit or gang. This arrangement eliminates obstructions in the space over the crop rows due to the shields or shield support mechanism.

In spite of the recent advances with shields, problems are still encountered when soil, rocks and other debris hit the shields; the shields are not rigid and can be deflected into the crop plants, thereby causing crop damage. In particular, with the use of single vertical mounting brackets, each shield may rotate about the vertical bracket when subjected to the impact of debris at either of its end portions, deflecting the outer ends of the shield into the crop row. The shield also may rotate laterally about the mounting arm causing its lower or base portion to swing into the crop row. Even with the use of two parallel vertical brackets, while rotation about the two brackets is reduced the shield still may swing outwardly about the mounting arm. A second problem arises when the shields contact substantial rocks or other heavy debris embedded in the ground. The impact of such rocks or debris on the shield's leading edge can cause damage to the shield assembly or divert the shield into the crop, even where spring arrangements are employed.

It is highly desirable to provide a shield assembly with stabilized shields that provide optimum protection to the plants being cultivated. It is also desirable for the shield assembly to readily retract to the extent necessary to overcome the impact of debris or rocks it has encountered, but it must be kept in mind that too much vertical movement of the shield will expose the plants to the soil and debris being thrown sideways by the cultivator. It is also desirable to provide such a shield assembly that is mounted over the cultivator implements so that there is no interference with tall plants in the crop rows being cultivated.

It is therefore an object of this invention to provide an improved shield assembly which operates to provide optimum protection to crops without resulting in damage to the shield assembly.

Another object of this invention is to provide a shield combination which can withstand the impact of flying debris from a cultivator and not deflect into the crop rows.

It is a further object of this invention to provide a shield assembly which can retract generally horizontally, about an axis perpendicular to the shields, to avoid sustaining damage from embedded or substantial rocks but which will remain close to the ground to protect the crop plants.

It is yet another object to provide a shield assembly that satisfies the preceding objects which at the same time maintains clearance for tall crop plants.

Other objects and advantages of this invention will become apparent upon reading the following detailed description and appended claims and upon reference to the accompanying drawings.

SUMMARY OF THE INVENTION

In accordance with one preferred embodiment of this invention the aforementioned requirements and objects are satisfied with shields which are mounted to a shield assembly such that they are laterally rigid but vertically retractable. The shield assembly includes a parallelogram linkage system with a torque bar, to add stability, and slotted top links as well as a spring across a top and bottom link to facilitate pivotal movement of the shields. Each shield is mounted to at least two support portions; a first portion near the leading edge of the shield which is substantially vertical and a second portion which crosses the shield's main portion diagonally. As a result, rotation about either axis of the plane of the shield is virtually eliminated.

The support portions of a pair of shields are attached to opposite ends of a shield mounting bar. The mounting bar is welded to the parallel linkage system at the upper portion of the vertical links. Opposing top links of the parallelogram linkage system are mounted at one end to the vertical links and at the other end to the bracket of a parallelogram linkage for the cultivator mechanism. The top links have a slot to accommodate limited horizontal movement of the mounting bar. The slot enables the shield mounting bar and the attached shields to pivot when they encounter fixed debris. Further vertical movement of the shields is accommodated by the parallelogram linkage system.

DESCRIPTION OF THE DRAWINGS

For a more complete understanding of this invention, reference should be made to the embodiments illustrated in greater detail in the accompanying drawings and described below by way of examples of the invention.

FIG. 3 is perspective view of the shield assembly of FIG. 2;

FIG. 4 is a perspective view of the parallelogram linkage portion of the shield assembly, taken from the side opposite that of FIGS. 1-3, and FIG. 5 is a front view, partially in section, of a chain system for adjusting the height of the shields, shown where the chain engages the parallelogram linkage system.

DETAILED DESCRIPTION

Figure 1:
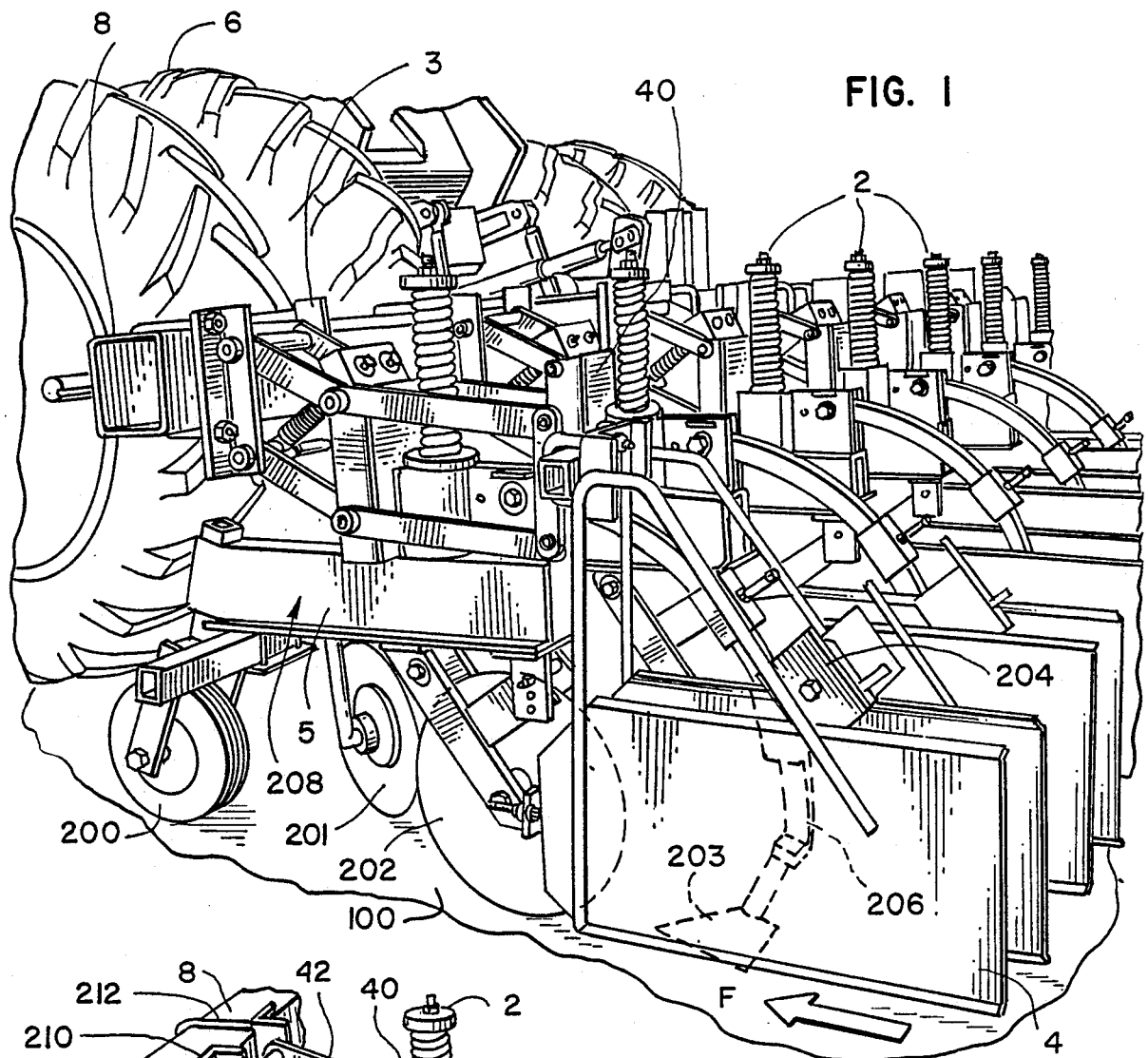
FIG. 1 is a perspective view of a series of shield assemblies of a preferred embodiment of this invention and corresponding cultivator portions (with some of the cultivator implements shown in phantom lines) attached to a tractor.

Referring to FIG. 1, a series of cultivator units or gangs 2 are shown attached to the main tool bar 8 of a cultivator implement 3 mounted on the three-point hitch at the rear of a tractor 6. Each of the cultivator gangs 2 includes a cultivator portion 5 and a shield assembly portion 4. Each cultivator portion 5 includes a depth wheel 200, disc hillers 201, a coulter 202, and a sweep 203 with an adjustable ridger 204 on a curved shank 206 (shown by phantom lines in FIG. 1), all mounted on a frame which includes a longitudinal member 208 and a generally vertical mounting bracket 40.

Figure 2:
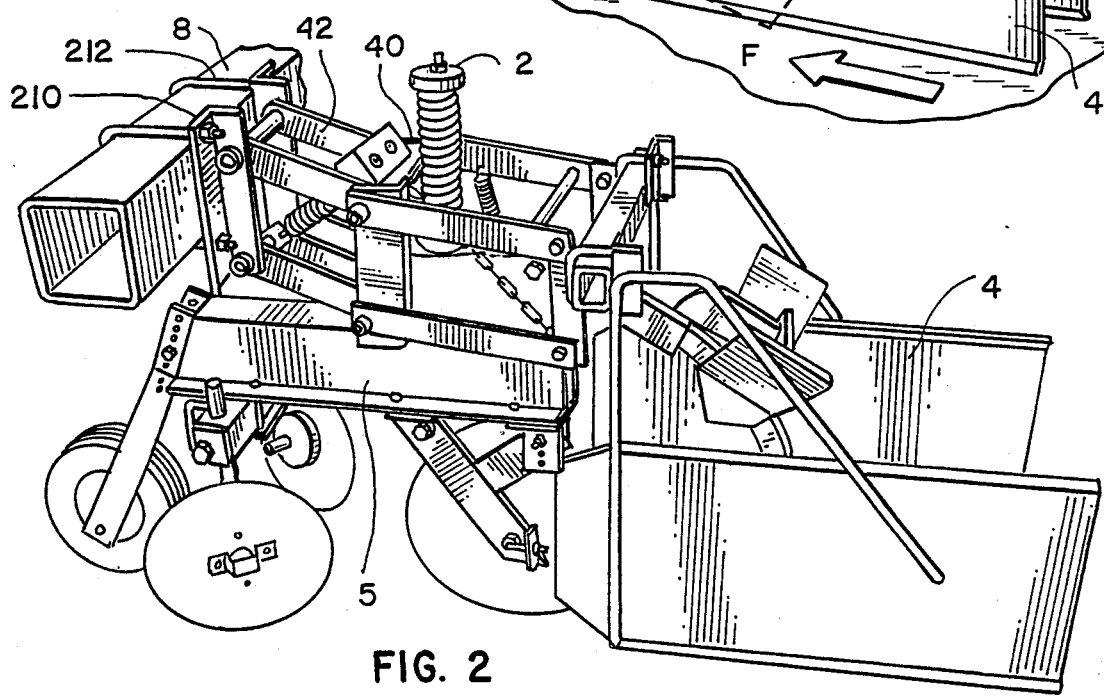
FIG. 2 is a perspective view of one of the shield assemblies shown in FIG. 1 attached to its respective cultivator portion.

One of the cultivator gangs 2 is shown in FIG. 2. The shield assembly portion 4 is attached to the cultivator portion 5 at the vertical support bracket 40 which is located at the distal or back end of the main attachment linkage 42 of the cultivator portion 5. The linkage 42 is attached to the tool bar 8 by attachment brackets 210 and U-bolts 212.

The shield assembly portion 4 is shown separately in FIG. 3. The shield assembly portion 4 includes a shield parallelogram linkage system 32 and a pair of support shield portions 9 with shields 10 and supports 24. The shield linkage system 32 includes an upper or top pair of generally horizontal links 36 and a lower or bottom pair of parallel links 38, all pivotally joined to the bracket 40, with vertical links 34 pivotally joined to the distal ends of the links 36 and 38 by appropriate pivot bolts 70 and sleeves 71 at 39a and 39b (see FIG. 5). A laterally extending horizontal mounting bar 28 is welded to the upper portions of the vertical links 34. The two shield portions 9 are mounted to the opposite ends of the mounting bar 28 by U-shaped bolts 30 through legs 26a of opposing L-shaped brackets 26, and nuts 31. Supports 24 for the shields discussed in detail below, are secured to the other legs 26b of the L-shaped brackets 26, as by being welded thereto.

Each shield 10 is preferably formed of sheet metal, e.g., 18 gauge. Referring, for example, to the outer shield 10a, each shield includes two portions, a flat portion 14 measuring about 15¼" by 31" and a bent portion 12 measuring about 10¼" by 5¾". The bent portion is at an acute angle of about 30 degrees to the side of the shield 10a that faces the cultivator portion 5 such that the portions 12, 14 form a forwardly diverging throat. When the cultivator is moving forward, dirt and other debris are deflected off the bent portion 12 as well as the flat portion 14 of the shield 10. The bent portion 12 is preferably trapezoidal in configuration and includes a leading front edge 16 and a bottom portion 18.

Each shield support 24 includes a forward vertical portion 24a which is welded in part to where the shield bent portion 12 and flat portion 14 meet and to the bracket 26. A rear portion extends angularly downward and to the rear across the shield, including a horizontal portion 24b which is welded to the leg 26b of the L-shaped bracket 26, and a diagonal portion 24c which is welded to the flat portion 14 of the shield 10. These supports may be formed of one unitary piece, such as a unitary length of bent tubing shown in FIGS. 1-3. It is envisioned that alternatively, the diagonal portion 24c that is welded to the shield could take the form of a portion that is horizontal in part and vertical in part. The important feature is that the rear portion of the support includes horizontal and vertical coordinates. In any event, the shield supports 24 provide rigid support and stability for the large shields 10 whereby these shields are held in fixed position relative to one another. Moreover, the shields 10 are stabilized against lateral movement while permitting vertical tilting and lifting retractive movement as referred to further below.

The shield assembly parallelogram linkage system 32 is shown best in FIG. 4. As discussed above, the shield assembly linkage system 32 includes a pair of vertical links 34, a pair of top generally horizontal links 36 and a pair of bottom generally horizontal links 38. The front of the linkage system 32 comprises a pair of linkage shafts 41 through the bracket 40 of the cultivator linkage 42 and held in place by roll pins 43. A torque bar 48 extends between and is affixed to the top links 36. In the illustrated embodiment, the affixation is accomplished by welding at one end 48a and at the other end 48b with the use of a bracket 49 welded to the bar 48 and bolted with a bolt 51 to the respective link 36 for removability as referred to below. This torque bar 48 adds lateral stability to the parallel linkage system 32 and thus to the shield assembly. Each top link 36 is slotted at 44 where it is attached to the vertical link 34 at 39a for sliding or lost motion movement between the vertical and top links. The sleeve or bushing 71 located at 39a facilitates movement of the vertical link in this slot. An extension spring 46 is hooked at one end to a first top link 36a and at its other end to a corresponding bottom link 38a. A second similar extension spring (not shown) can be connected between the opposing top and bottom links 36b, 38b.

FIGS. 4 and 5 show the shield adjustment chain arrangement 50 which can be used to alter the vertical positioning and thus the height of the shields 10 from the ground 100. In particular, as shown in FIG. 4, one end of a link chain 52 is affixed to the bracket 40 of the cultivator linkage 42 by placing one link 52a over a catch 62. A pin 64 prevents the link 52a from slipping out of the catch 62. FIG. 5 shows a front view of the opposite end of the chain arrangement 50. One of the chain links 52b is engaged on the pivot bolt 70 at the junction of a vertical link 34 and a bottom link 38 of the shield linkage system 32. The bolt 70 also extends through a bushing 71 placed in holes in each of these links 34, 38 as well as the chain link 52b and is held in place with a nut 59 and a lock washer 60. The height of each shield 10 from the ground 100 can be varied by removing the pin 64, lifting the chain out of the catch 62 and reattaching the chain at another link, thereby altering the effective length of the chain 50 and the height or clearance setting of the shield assembly parallel linkage system 32 and the attached shield portions 9. When the shield portions are lifted, the shields 10 are raised from the ground. The appropriate link 52 can then be placed in the catch 62 and secured with the pin 64. The shields 10 can be lowered in a similar manner by lengthening the chain.

With the structure of the shield assembly portion 4 described, the operation of this assembly as part of the cultivator 2 can now be described. In particular, referring to FIG. 1, as the tractor 6 moves forward (in the direction of the arrow F) the cultivator 2 with the shield assembly portions 4 and the cultivator gangs 5 follows. The cultivator portions 5 work the ground between the rows of crops. For instance, cultivating without significant building of ridges can be accomplished by use of the coulter 202, disc hillers 201 and sweep 203. Ridge building can be enhanced while cultivating with the above implements by repositioning the ridgers 204 on the shanks 206 from the retracted inactive position shown in the drawings to an active position immediately above the respective sweep 203. These methods of cultivating and building ridges are known to one skilled in the art and do not form a part of this invention. During cultivation, as the coulter 202 cuts the soil and the sweep 203 moves the soil, debris is uprooted and tends to be thrown laterally outward. During cultivating while ridge building, this lateral throwing action is much more prevalent. In each instance, the shields 10 prevent the crops from being damaged. One advantage with the particular structure of this invention is that the pairs of shields are mounted by components disposed above the cultivating implements, leaving the spaces above the rows of plant crops open. Therefore, crops of any height can be cultivated with the shields of this invention. In addition, because of the stability of the shields, the cultivator can pass more rapidly through the fields early in the growing season. This is because the small plants remain protected by the stable shields from soil or dirt even though more soil or dirt would be thrown about during such rapid cultivation. Less stable shields could be displaced by the soil whereby the soil would cover small plants.

As debris from cultivating or ridge building impacts the shields 10, the shields do not move about either the vertical or horizontal axes of the flat portion 14 thereof. Such movement is prevented in part because of the location of the supports 24. In particular, the vertical portion 24a prevents the shield from rotating about the vertical axis in the plane of the flat portion 14 and the diagonal portion 24c prevents movement of the respective shield about any axis in the plane of the flat portion 14. It is important to understand that the torque bar 48 which is part of the shield assembly parallel linkage system 32 provides further stability to the overall system as it maintains the shields 10 in a constant relative position. As a result, regardless of the impact of the debris hitting the shields, the shields remain rigid against lateral movement and do not pivot about any axis in the plane of the respective flat portion 14.

While the use of the supports 24 and the torque bar 48 prevent the shields from moving laterally into the crops, the parallel linkage system 32 enables the shields of each assembly 4 to pivot about an axis perpendicular to the vertical planes of the shield. Such movement is necessary when heavy rocks, stones or other embedded debris are encountered at the leading edge of the shield 16 and particularly at the bottom 18 of the bent portion of the shield. The slots 44 of the top links 36 enable the shields to initially yield with a horizontal pivoting motion about the distal bottom axes 39 of the lower linkage links 38 when the shields strike any obstruction, such as a rock. As a result, the vertical movement of shields 10 is limited and the shields continue to provide protection to the crops. However, when further force is applied, as when larger stones or fixed debris are encountered and the vertical links are displaced along the entire length of the slot, the parallel linkage system 32 can then react permitting the shields to rise upwardly to clear the obstruction. Because of the parallel linkage, the bottoms of the shields rise substantially parallel to the ground rather than rotating about the leading edge where the distal edge of the shield would be displaced substantially exposing the crop plants to debris. At the same time, the limited rearward tilt of the shields permitted by the slots 44 facilitates resolving the obstruction force to generate an upward force for this clearing movement to protect the shield assembly. The extension spring 46 extends at an angle to the end links and provides a net upward moment on the linkage tending to counterbalance a portion of the weight of the movable shields, thereby facilitating upward movement upon encountering obstacles. This counterbalancing can be accomplished with the use of a single spring as shown or by using two springs on opposite sides of the linkage.

The shield assembly 4 of the subject invention can be removed from the cultivator readily such that only the cultivator portion 5 remains. This is accomplished by removing the roll pins 43 from the linkage shafts 41 and the bolt 51 holding one end of the torque bar 48b, then sliding the respective top and bottom links 36, 38 off of the respective linkage shafts 41. Alternatively one or both of the shield portions 9 can be removed readily by removing the U-bolts 30. When the shield portions are so removed, the mounting bar 28 and linkage system 32 remain attached to the cultivator portion 5.

With the above description, a preferred embodiment of the subject open-top shield assembly has been set forth. The objects of this invention are satisfied by providing rigid shield assemblies that assure virtually no side-to-side movement of the shields. Furthermore, the use of a slot in the parallel linkage system provides the shield portion the ability to tilt initially in response to impacts with obstructions. The shield portion further responds to greater forces, such as from larger embedded objects, by upward movement with the linkage system 32. As a result, maximum protection is provided to the crops and at the same time, the shield assembly is subjected to a low risk of being damaged.

While a preferred embodiment of the invention has been shown, it will be understood, of course, that the invention is not limited thereto since modifications may be made and other embodiments of the principles of this invention will occur to those skilled in the art to which this invention pertains, particularly, upon considering the foregoing teachings. It is, therefore, contemplated by the appended claims to cover any such modifications and other embodiments as incorporate those features which constitute the essential features of this invention within the true spirit and scope of the following claims.

What is claimed is:

1. A cultivator implement including a series of cultivator units for cultivating the spaces between rows of corps, each of said units comprising a cultivator portion including at least one cultivating tool and a shield assembly mounted to said cultivator portion, said shield assembly including at least one shield with a substantially vertical flat portion, and an upwardly extending support structure for said shield including a first support which is substantially vertical and is affixed to the fore section of the shield and a second support which is affixed to the aft section of the shield, said second support being integral with and extending rearwardly and downwardly from said first support, said support structure rigidly secured to and supporting said shield such that the shield is stabilized and is not substantially laterally displaceable and does not rotate about any axis in the plane of said flat portion under the forces encountered during cultivation.

2. The invention of claim 1 wherein said support structure also includes a parallelogram linkage system supporting said shield and including a top pair of generally horizontal links, a bottom pair of generally horizontal links, and a pair of generally vertical links, each vertical link pivotally joined at its ends to vertically movable portions of said bottom and top links to form parallel spaced linkages which permit vertical movement of said vertical links, the portion of said support structure comprising said first and second supports being affixed to said vertical links such that each such shield can retract upward in response to forces encountered by the shield during cultivation and said support structure supports each such shield rigidly to prevent lateral movement of the shield.

3. The invention of claim 1 wherein said first support and second support are permanently affixed to said shield.

4. A cultivator implement including a series of cultivator units for cultivating the spaces between rows of crops, each of said units comprising a cultivator portion including at least one cultivating tool and a shield assembly mounted to said cultivator portion, said shield assembly including at least one shield with a substantially vertical flat portion, and a support structure for said shield including a first support which is substantially vertical and is affixed to the fore section of the shield and a second support which is affixed to the aft section of the shield, wherein said support structure also includes a parallelogram linkage system supporting said shield and including a top pair of generally horizontal links attached to said cultivator portion, a bottom pair of generally horizontal links attached to said cultivator portion, and a pair of generally vertical links, each vertical link pivotally joined at its ends to vertically movable portions of said bottom and top links to form parallel spaced linkages which permit vertical movement of said vertical links relative to said cultivator portion, the portion of said support structure comprising said first and second supports being affixed to said vertical links such that each such shield can retract upward relative to the cultivator portion in response to forces encountered by the shield during cultivation and said support structure supports each such shield rigidly to prevent lateral movement of the shield.

5. A shield assembly for a cultivator unit comprising at least one shield with a substantially vertical flat portion and a support structure for said shield including a first support which is substantially vertical and is affixed to the fore section of the shield, and a second support which is affixed to the aft section of the shield, wherein said support structure also includes a parallelogram linkage system including a top pair of generally horizontal links for pivotal support on such a cultivator unit, a bottom pair of generally horizontal links for pivotal support on such a cultivator unit, and a pair of generally vertical links, each vertical link pivotally joined at its ends to vertically movable portions of said bottom and top links to form parallel spaced linkages which permit vertical movement of said vertical links, the portion of said support structure comprising said first and second supports being affixed to said vertical links such that each such shield can retract upward relative to a cultivator unit on which said horizontal links are mounted, in response to forces encountered by the shield during cultivation, and said support structure supports each such shield rigidly to prevent lateral movement of the shield.

6. A cultivator implement including a series of cultivator units for cultivating the spaces between rows of crops, each of said units comprising a cultivator portion including at least one cultivating tool and a shield assembly mounted to said cultivator portion, said shield assembly including at least one shield with a substantially vertical flat portion, and a support structure for said shield including a first support which is substantially vertical and is affixed to the fore section of the shield and a second support which is affixed to the aft section of the shield, wherein said support structure also includes a parallelogram linkage system supporting said shield and including a top pair of generally horizontal links attached to said cultivator portion, a bottom pair of generally horizontal links attached to said cultivator portion, and a pair of generally vertical links, each vertical link pivotally joined at its ends to vertically movable portions of said bottom and top links to form parallel spaced linkages which permit vertical movement of said vertical links, the portion of said support structure comprising said first and second supports being affixed to said vertical links such that each such shield can retract upward in response to forces encountered by the shield during cultivation and said support structure supports each such shield rigidly to prevent lateral movement of the shield, and the respective vertical link is joined to the top link through a slotted connection such that the vertical link can pivot from its vertical orientation and thereby permit vertical pivotal movement of each such shield in response to forces encountered by said shield during cultivation.

7. The invention of claim 1 or 4 wherein each cultivator portion includes a bracket above said cultivator tool, and each shield assembly includes mounting means disposed over a respective adjacent cultivator portion and attached to the respective bracket for supporting each such shield, whereby each shield is mounted by components disposed above the respective cultivating tool and the space above the rows of plant crops is unobstructed by the shield assembly.

8. The invention of claim 2, 4 or 5 wherein the respective vertical link is joined to the top link through a slotted connection such that the vertical link can pivot from its vertical orientation and thereby permit vertical pivotal movement of each such shield in response to forces encountered by said shield during cultivation.

9. The invention of claim 2, 4 or 5 wherein a spring is attached across the linkage to a top link and bottom link, to counterbalance a portion of the weight of the shield assembly.

10. The invention of claim 2, 4 or 5 having shield height adjustment means attached to said parallelogram linkage system.

11. The invention of claim 8, 4, 5 or 6 wherein a torque bar is mounted at its opposite ends to the inside faces of opposing top links thereby providing additional lateral and rotational stability to each such shield.

12. A shield assembly for a cultivator comprising at least one shield with a substantially vertical flat portion and an upwardly extending support structure for said shield including a first support which is substantially vertical and is affixed to the fore section of the shield and a second support which is affixed to the aft section of the shield, said second support being integral with and extending rearwardly and downwardly from said first support, said support structure rigidly secured to and supporting said shield such that the shield is stabilized and is not substantially laterally displaceable and does not rotate about any axis in the plane of said flat portion under the forces encountered during cultivation.

13. The invention of claim 12 wherein said support structure also includes a parallelogram linkage system including a top pair of generally horizontal links, a bottom pair of generally horizontal links, and a pair of generally vertical links, each vertical link pivotally joined at its ends to vertically movable portions of said bottom and top links to form parallel spaced linkages which permit vertical movement of said vertical links, the portion of said support structure comprising said first and second supports being affixed to said vertical links such that the shield can retract upward in response to forces encountered by the shield during cultivation and said support structure supports each such shield rigidly to prevent lateral movement of the shield.

14. The invention of claim 13 wherein each top link is slotted where the respective vertical link is joined to the top link such that the vertical link can pivot from its vertical orientation and thereby permit vertical pivotal movement of each such shield in response to forces encountered during cultivation.

15. The invention of claim 13 wherein a spring is attached across the linkage to a top link and bottom link, to counterbalance a portion of the weight of the shield portion.

16. The invention of claim 13 wherein a torque bar is mounted at its opposite ends to the inside faces of opposing top links thereby providing additional lateral stability to the shield.

17. The invention of claim 13 having shield height adjustment means attached to said parallelogram linkage system.

18. The invention of claim 12 wherein said first support and second support are permanently affixed to said shield.

19. An implement including multiple cultivator units; each of said units including a cultivator portion and a shield assembly comprising a shield located on each side of the respective cultivator portion and a common support structure for said shields of said unit disposed over the respective cultivator portion, each shield rigidly mounted in the shield assembly to prevent deflection lateral to the cultivator unit, and mounting means disposed over said respective cultivator portion for attaching said common support structure to said cultivator portion and allowing vertical movement of the shield relative to the cultivator portion; whereby each shield assembly is mounted to the respective cultivator portion, and the spaces between and above opposed shield assemblies of adjacent cultivator units being unobstructed by the shield assemblies.

20. The invention of claim 19 wherein said mounting means of each of said units includes a parallelogram linkage located above the respective cultivator portion and the respective common support structure is mounted to said linkage for generally vertical movement of the respective shield assembly in response to forces encountered during cultivation.

21. The invention of claim 20 wherein the common support structure of each of said units is pivotally mounted to the respective parallelogram linkage for limited pivotal movement of the respective shield assembly in the plane of the shields thereof in response to forces encountered during cultivation.

22. The invention of claim 20 wherein a torque bar is mounted to the parallelogram linkage whereby additional lateral and rotational stability is provided to the shield.

23. The invention of claim 19 wherein said support structure and mounting means permit vertical movement of said shields.

24. A cultivator implement including a series of cultivator units for cultivating the spaces between rows of crops, each of said units comprising a cultivator portion including at least one cultivating tool and a shield assembly mounted to said cultivator portion, said shield assembly including at least one shield with a substantially vertical flat portion, and a support structure for said shield including a first support which is substantially vertical and is affixed to the fore section of the shield and a second support which is affixed to the aft section of the shield, wherein said support structure also includes a parallelogram linkage system supporting said shield and including a top pair of generally horizontal links attached to said cultivator portion, a bottom pair of generally horizontal links attached to said cultivator portion, and a pair of generally vertical links, each vertical link pivotally joined at its ends to vertically movable portions of said bottom and top links to form parallel spaced linkages which permit vertical movement of said vertical links, the portion of said support structure comprising said first and second supports being affixed to said vertical links such that each such shield can retract upward in response to forces encountered by the shield during cultivation and said support structure supports each such shield rigidly to prevent lateral movement of the shield, and wherein said parallelogram linkage system includes means for adjusting the shield height.

25. A shield assembly for a cultivator unit comprising at least one shield with a substantially vertical flat portion and a support structure for said shield including a first support which is substantially vertical and is affixed to the fore section of the shield, and a second support which is affixed to the aft section of the shield, wherein said support structure also includes a parallelogram linkage system including a top pair of generally horizontal links, a bottom pair of generally horizontal links, and a pair of generally vertical links, each vertical link pivotally joined at its ends to vertically movable portions of said bottom and top links to form parallel spaced linkages which permit vertical movement of said vertical links, the portion of said support structure comprising said first and second supports being affixed to said vertical links such that each such shield can retract upward in response to forces encountered by the shield during cultivation and said support structure supports each such shield rigidly to prevent lateral movement of the shield, and wherein the respective vertical link is joined to the top link through a slotted connection such that the vertical link can pivot from its vertical orientation and thereby permit vertical pivotal movement of each such shield in response to forces encountered during cultivation.

26. A shield assembly for a cultivator unit comprising at least one shield with a substantially vertical flat portion and a support structure for said shield including a first support which is substantially vertical and is affixed to the fore section of the shield, and a second support which is affixed to the aft section of the shield, wherein said support structure also includes a parallelogram linkage system including a top pair of generally horizontal links, a bottom pair of generally horizontal links, and a pair of generally vertical links, each vertical link pivotally joined at its ends to vertically movable portions of said bottom and top links to form parallel spaced linkages which permit vertical movement of said vertical links, the portion of said support structure comprising said first and second supports being affixed to said vertical links such that each such shield can retract upward in response to forces encountered by the shield during cultivation and said support structure supports each such shield rigidly to prevent lateral movement of the shield, and wherein said parallelogram linkage system includes means for adjusting the shield height.

27. An implement with multiple cultivator units; each of said units including a cultivator portion and a shield assembly comprising a shield located on each side of the respective cultivator portion and a common support structure for said shields of said unit disposed over the respective cultivator portion, each shield rigidly mounted in the shield assembly to prevent deflection lateral to the cultivator unit, and a parallelogram linkage disposed over said respective cultivator portion for attaching said common support structure to said cultivator portion wherein the said common support structure of each of said units is pivotally mounted to the respective parallelogram linkage for limited pivotal movement of the respective shield assembly in the plane of the shields in response to forces encountered during cultivation, the spaces between and above opposed shield assemblies of adjacent cultivator units being unobstructed by the shield assemblies.

* * * * *

UNITED STATES PATENT AND TRADEMARK OFFICE
CERTIFICATE OF CORRECTION

PATENT NO. : 4,905,770

DATED : March 6, 1990

INVENTOR(S) : John A. Hanig

It is certified that error appears in the above-identified patent and that said Letters Patent is hereby corrected as shown below:

Claim 1, line 3, "corps" should be --crops--.

Signed and Sealed this

Twenty-first Day of May, 1991

Attest:

HARRY F. MANBECK, JR.

*Attesting Officer*     *Commissioner of Patents and Trademarks*